United States Patent
Wu et al.

(10) Patent No.: US 12,363,677 B2
(45) Date of Patent: Jul. 15, 2025

(54) METHOD AND APPARATUS FOR PAGING CONTROL

(71) Applicant: Lenovo (Beijing) Ltd., Beijing (CN)

(72) Inventors: Lianhai Wu, Chaoyang (CN); Prateek Basu Mallick, Dreieich (DE); Genadi Velev, Darmstadt (DE); Jie Shi, Haidian District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 421 days.

(21) Appl. No.: 17/798,368

(22) PCT Filed: Feb. 13, 2020

(86) PCT No.: PCT/CN2020/075086
§ 371 (c)(1),
(2) Date: Aug. 9, 2022

(87) PCT Pub. No.: WO2021/159389
PCT Pub. Date: Aug. 19, 2021

(65) Prior Publication Data
US 2023/0345417 A1    Oct. 26, 2023

(51) Int. Cl.
*H04W 68/02* (2009.01)
*H04W 76/30* (2018.01)

(52) U.S. Cl.
CPC ........... *H04W 68/02* (2013.01); *H04W 76/30* (2018.02)

(58) Field of Classification Search
CPC .............................. H04W 68/02; H04W 76/30
USPC ......................................................... 370/329
See application file for complete search history.

(56) References Cited

U.S. PATENT DOCUMENTS

| | | | |
|---|---|---|---|
| 10,159,016 B2 | 12/2018 | Purohit et al. | |
| 2010/0008235 A1* | 1/2010 | Tinnakornsrisuphap | H04L 61/5046 370/254 |
| 2012/0172011 A1* | 7/2012 | Gupta | H04W 68/02 455/414.1 |
| 2015/0092639 A1* | 4/2015 | Jia | H04W 52/02 370/311 |
| 2018/0049270 A1* | 2/2018 | Kubota | H04W 88/08 |

(Continued)

FOREIGN PATENT DOCUMENTS

| CN | 106464611 A1 | 2/2017 |
|---|---|---|
| CN | 109548113 A | 3/2019 |

(Continued)

OTHER PUBLICATIONS 202080096164.2, "Foreign Office Action", CN 202080096164.2, Jul. 8, 2024, 19 pages.

(Continued)

*Primary Examiner* — Mark G. Pannell
(74) *Attorney, Agent, or Firm* — FIG. 1 Patents

(57) ABSTRACT

The present disclosure relates to methods and apparatuses. According to some embodiments of the disclosure, a method includes: receiving, at a user equipment, information indicating whether busy indication functionality is supported or not, wherein the busy indication functionality is associated with at least one of Core Network (CN) paging or Radio Access Network (RAN) paging. In addition, a cause value indicating busy indication between Xn interface can be used to determine whether the path switching should be performed or not.

20 Claims, 9 Drawing Sheets

(56) References Cited

U.S. PATENT DOCUMENTS

| | | | |
|---|---|---|---|
| 2019/0075511 A1* | 3/2019 | Ryu | H04W 68/005 |
| 2020/0187088 A1* | 6/2020 | Chun | H04W 48/02 |
| 2020/0259896 A1* | 8/2020 | Sachs | H04W 56/0065 |
| 2020/0305118 A1* | 9/2020 | Ryu | H04W 76/10 |
| 2021/0014667 A1* | 1/2021 | Lovlekar | H04W 88/06 |
| 2021/0211970 A1* | 7/2021 | Lee | H04W 28/22 |
| 2022/0030548 A1* | 1/2022 | Chun | H04W 8/183 |
| 2022/0240213 A1* | 7/2022 | Ly | H04W 48/18 |

FOREIGN PATENT DOCUMENTS

| | | |
|---|---|---|
| CN | 108605382 A | 9/2019 |
| EP | 3361820 A1 | 8/2018 |
| WO | 2021113581 A1 | 6/2021 |

OTHER PUBLICATIONS 20919350.7, "Extended European Search Report", EP Application No. 20919350.7, Jan. 26, 2024, 18 pages.

3GPP, "Study on system enablers for devices having multiple Universal Subscriber Identity Modules (USIM)", 3GPP TR 23.761 V0.3.0, 3rd Generation Partnership Project [retrieved Aug. 24, 2022]. Retrieved from the internet <https://www.3gpp.org/ftp/Specs/archive/23_series/23.761/>., Jan. 2020, 37 Pages.

PCT/CN2020/075086, "International Preliminary Report on Patentability", PCT Application No. PCT/CN2020/075086, Aug. 25, 2022, 6 pages.

PCT/CN2020/075086, "International Search Report and Written Opinion", PCT Application No. PCT/CN2020/075086, Nov. 18, 2020, 8 pages.

Qualcomm, "Update solution #3 for KI#1: Fast release after UE response paging", SA WG2 Meeting #136AH, S2-2000120, Incheon, Korea [retrieved Aug. 24, 2022]. Retrieved from the internet <https://www.3gpp.org/ftp/Meetings_3GPP_SYNC/SA2/Docs?sortby-sizerev>., Jan. 2020, 4 Pages.

Sony, "KI#2: Update Solution #3 Busy Indication", SA WG2 Meeting #136AH, S2-2000838, Incheon, South Korea [retrieved Aug. 24, 2022]. Retrieved from the internet <https://www.3gpp.org/ftp/Meetings_3GPP_SYNC/SA2/Docs?sortby=sizerev>., Jan. 2020, 4 Pages.

20919350.7, "Communication Pursuant to Rule 164(1) EPC", EP Application No. 20919350.7, Oct. 13, 2023, 14 pages.

Nokia, et al., "Operator controlled Handling of Paging Cause code", SA WG2 Meeting #136-AH, S2-2000857, Incheon, Korea [retrieved Oct. 23, 2023]. Retrieved from the Internet <https://www.3gpp.org/ftp/tsg_sa/WG2_Arch/TSGS2_136AH_Incheon/TdocsByAgenda_01-29_1545.htm>, Jan. 2020, 5 pages.

* cited by examiner

METHOD AND APPARATUS FOR PAGING CONTROL

TECHNICAL FIELD

The present disclosure generally relates to wireless communication technology, and more particularly to paging control in a wireless communication system.

BACKGROUND

A wireless communication device (e.g., a cell phone, a tablet, a laptop, an internet-of-things (IoT) device, etc.), which may include two or more Subscriber Identity Modules (SIMs), can be referred to as a multi-SIM wireless communication device.

Generally, a SIM may correspond to at least one subscription in an environment where Radio Access Technology (RAT) is adopted. For example, a multi-SIM wireless communication device may have a first SIM associated with a first subscription and a second SIM associated with a second subscription. The first SIM and the second SIM can share the same hardware component(s), e.g., Radio Frequency (RF) component(s) or baseband component(s). In this scenario, during a specific time period, a multi-SIM wireless communication device with a single Transmit/Receive (TX/RX) chain may monitor only a single wireless network.

When one SIM of the multi-SIM wireless communication device is in an ongoing service (e.g., voice call), another SIM of the multi-SIM wireless communication device may receive a paging message from the corresponding Base Station (BS). If the wireless communication device decides to respond to the paging message, the voice call may be interrupted. However, if the wireless communication device does not respond to the paging message, the network may waste more paging resources. For example, the network may escalate the page across a larger area.

There is a need for handling paging control between multi-SIM wireless communication device(s) and networks or BSs in a wireless communication system.

SUMMARY OF THE DISCLOSURE

Some embodiments of the present disclosure provide a method. The method may include: receiving, at a user equipment, information related to busy indication functionality. The busy indication functionality may be associated with at least one of Core Network (CN) paging or Radio Access Network (RAN) paging. The method may include transmitting, from a Non-Access Stratum (NAS) layer of the user equipment to an Access Stratum (AS) layer of the user equipment, an indicator indicating that a plurality of subscriber identity modules of the user equipment are activated.

In an embodiment of the present application, the information may be broadcasted by a base station. In an embodiment of the present application, the information may include an indicator having at least one bit, and the indicator may indicate one of the following: whether busy indication functionality for CN paging is supported or not; whether busy indication functionality for RAN paging is supported or not; and whether busy indication functionality for both CN paging and RAN paging is supported or not.

In another embodiment of the present application, the information may include an Information Element (IE) indicating one of the following: whether busy indication functionality for CN paging is supported or not; whether busy indication functionality for RAN paging is supported or not; and whether busy indication functionality for both CN paging and RAN paging is supported or not. The value of the IE may be of an enumerated type.

In yet another embodiment of the present application, the method may include determining that the busy indication functionality is supported when the information includes parameters associated with the busy indication functionality. Determining that the busy indication functionality is supported may include determining one of the following: busy indication functionality for CN paging is supported; busy indication functionality for RAN paging is supported; and busy indication functionality for both CN paging and RAN paging is supported.

In another embodiment of the present disclosure, the information may be received via a Non-Access Stratum (NAS) message, and the information indicates whether busy indication functionality for CN paging is supported or not.

In another embodiment of the present disclosure, the information may be received via Radio Resource Control (RRC) dedicated signaling, and the information indicates one of the following: whether busy indication functionality for CN paging is supported or not; whether busy indication functionality for RAN paging is supported or not; and whether busy indication functionality for both CN paging and RAN paging is supported or not. The RRC dedicated signaling may include a RRC release message including a suspend configuration Information Element (IE).

Another embodiment of the present disclosure provides a method. The method may include: receiving a System Information Block (SIB); and determining that busy indication functionality associated with at least one of Core Network (CN) paging or Radio Access Network (RAN) paging is not supported when the SIB does not include parameters associated with the busy indication functionality.

Another embodiment of the present disclosure provides a method. The method may include: transmitting information related to busy indication functionality. The busy indication functionality may be associated with at least one of Core Network (CN) paging or Radio Access Network (RAN) paging.

In an embodiment of the present application, the method may include receiving, from a CN entity, an indicator that indicating whether busy indication functionality for CN paging is supported or not. The CN entity may include at least one of an Access and Mobility Management Function (AMF) node or an Operation Administration and Maintenance (OAM) node.

In an embodiment of the present application, transmitting the information may include broadcasting the information. In an embodiment of the present application, the broadcast information may include an indicator having at least one bit, and the indicator indicates one of the following: whether busy indication functionality for CN paging is supported or not; whether busy indication functionality for RAN paging is supported or not; and whether busy indication functionality for both CN paging and RAN paging is supported or not.

In another embodiment of the present application, the broadcast information may include an Information Element (IE) indicating one of the following: whether busy indication functionality for CN paging is supported or not; whether busy indication functionality for RAN paging is supported or not; and whether busy indication functionality for both CN paging and RAN paging is supported or not. The value of the IE may be of an enumerated type.

In yet another embodiment of the present application, the broadcast information may include parameters associated with the busy indication functionality when busy indication functionality for CN paging is supported, and wherein the broadcast information does not include parameters associated with the busy indication functionality when busy indication functionality for CN paging is not supported.

In yet another embodiment of the present application, the broadcast information may include parameters associated with the busy indication functionality when busy indication functionality for RAN paging is supported, and wherein the broadcast information does not include parameters associated with the busy indication functionality when busy indication functionality for RAN paging is not supported.

In yet another embodiment of the present application, the broadcast information may include parameters associated with the busy indication functionality when busy indication functionality for both CN paging and RAN paging is supported, and wherein the broadcast information does not include parameters associated with the busy indication functionality when busy indication functionality for both CN paging and RAN paging is not supported.

In another embodiment of the present disclosure, the method may include receiving, from a CN entity, a Non-Access Stratum (NAS) message including the information, the information indicates whether the busy indication functionality for CN paging is supported or not. Transmitting the information may include forwarding the NAS message to a user equipment.

In another embodiment of the present disclosure, transmitting the information may include transmitting the information via Radio Resource Control (RRC) dedicated signaling. The information may indicate one of the following: whether busy indication functionality for CN paging is supported or not; whether busy indication functionality for RAN paging is supported or not; and whether busy indication functionality for both CN paging and RAN paging is supported or not. The RRC dedicated signaling may include a RRC release message including a suspend configuration Information Element (IE).

Another embodiment of the present disclosure provides a method. The method may include: receiving, from a base station, a Radio Access Network (RAN) paging; and transmitting, to the base station, a Radio Resource Control (RRC) resume request message including a busy indication when busy indication functionality for RAN paging is supported. In an embodiment of the present disclosure, the method may include transmitting, to the base station, a RRC message including a Non-Access Stratum (NAS) service request message. The NAS service request message may include a busy indication.

Another embodiment of the present disclosure provides a method. The method may include: transmitting, to a User Equipment (UE), a Radio Access Network (RAN) paging; receiving, from the UE, a Radio Resource Control (RRC) resume request message including a busy indication; and transmitting, to a last serving base station of the UE, a retrieve UE context request message including a cause value indicating the busy indication.

In an embodiment of the present application, the method may include: receiving, from the last serving base station, a retrieve UE context response message; and transmitting, to an Access and Mobility Management Function (AMF) node, a path switch request message including the busy indication. The method may include: transmitting, to a User Plane Function (UPF) node, a message including the busy indication.

In another embodiment of the present disclosure, the method may include: receiving, from the user equipment, a RRC message including a Non-Access Stratum (NAS) service request message. The NAS service request message may include the busy indication. In an embodiment of the present disclosure, the method may include: receiving, from the last serving base station, a retrieve UE context failure message; and forwarding the NAS service request message to an Access and Mobility Management Function (AMF) node via the last serving base station. In another embodiment of the present disclosure, the method may include: receiving, from the last serving base station, a retrieve UE context response message; and forwarding, to an Access and Mobility Management Function (AMF) node, the NAS service request message.

Another embodiment of the present disclosure provides a method. The method may include: transmitting a Radio Access Network (RAN) paging; and receiving, from a base station, a retrieve UE context request message including a cause value indicating a busy indication in response to the RAN paging.

In an embodiment of the present application, the method may include transmitting, to the base station, a retrieve UE context failure message; and transmitting a message including the busy indication to at least one of an Access and Mobility Management Function (AMF) node or a User Plane Function (UPF) node.

In another embodiment of the present application, the method may include transmitting, to the base station, a retrieve UE context failure message; receiving, from the base station, a NAS service request message including the busy indication; and forwarding the NAS service request message to an Access and Mobility Management Function (AMF) node.

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
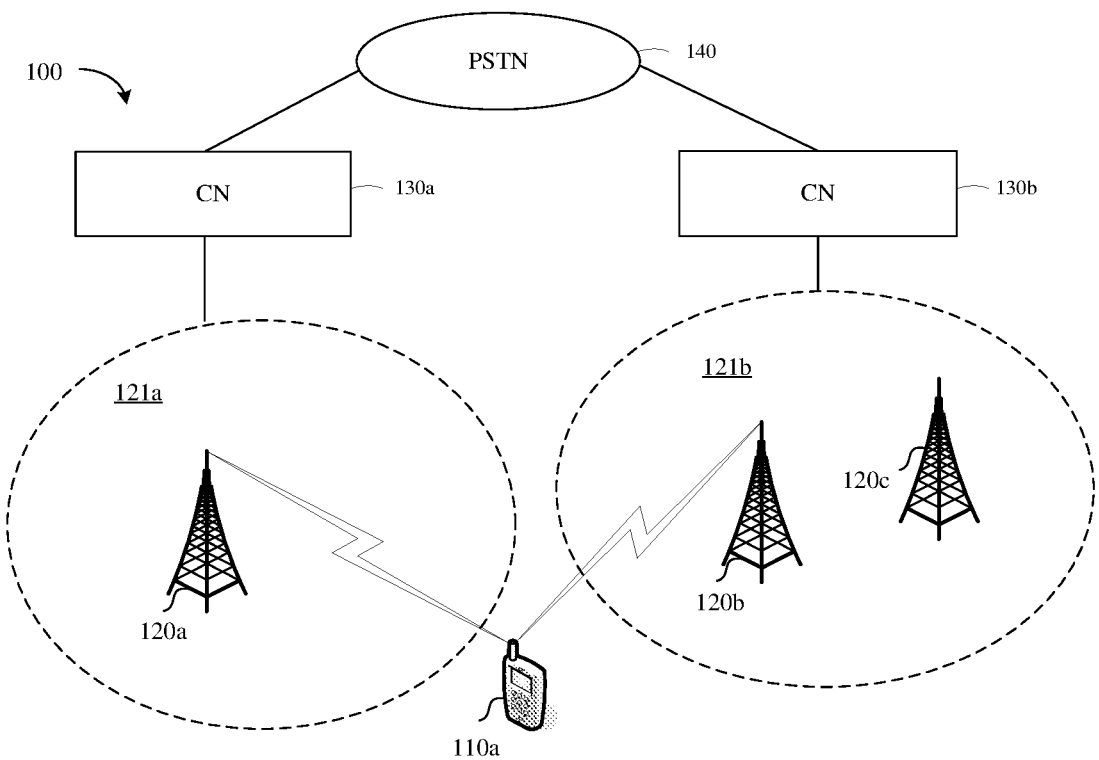
FIG. 1 illustrates a schematic wireless communication system according to some embodiments of the present disclosure.

FIG. 1 illustrates a wireless communication system 100 according to some embodiments of the present disclosure.

Referring to FIG. 1, a wireless communication system 100 may include some Wireless Communication Devices (WCDs) 110a, some base stations (BSs) 120a, 120b, and 120c, some Radio Access Networks (RANs) 121a and 121b, some Core Networks (CNs) 130a and 130b, and a Public Switched Telephone Network (PSTN) 140. It is contemplated that the wireless communication system 100 may include any number of wireless communication devices, BSs, networks, and/or network components.

Each of the BS 120a, BS 120b, and BS 120c may be any type of device configured to wirelessly interface with at least one WCD (e.g., WCD 110a) to facilitate access to one or more communication networks, such as the CN 130a and/or CN 130b. Each of the BS 120a, BS 120b, and BS 120c may operate, for example based on a standard protocol such as Long-Term Evolution (LTE), LTE-Advanced (LTE-A), New Radio (NR), or other suitable protocol(s). For example, the BS 120a, BS 120b, and BS 120c may include an eNB or a gNB. Persons skilled in the art should understand that as the 3GPP (3rd Generation Partnership Project) and communication technology develop, the terminologies recited in the specification may change, which should not affect the principle of the disclosure.

BS 120a may be part of RAN 121a, which may also include other BSs and/or network elements (not shown), such as a Base Station Controller (BSC), a Radio Network Controller (RNC), relay nodes, etc. Also, BS 120b and BS 120c may be part of RAN 121b that in addition, may also include other BSs and/or network elements (not shown in FIG. 1). Each of the BS 120a, BS 120b, and BS 120c may be configured to transmit and/or receive wireless signals within a particular geographic region, which may be referred to as a cell (not shown in FIG. 1). BSs may communicate with each other via Xn interface.

RAN 121a may be in communication with the CN 130a, and the RAN 121b may be in communication with the CN 130b. The RAN 121a and the RAN 121b may employ the same or different Radio Access Technologies (RATs). For example, RAN 121a may employ an Evolved Universal Terrestrial Radio Access Network (E-UTRAN) radio technology, and the RAN 121b may employ a NR radio technology. Each of the CN 130a and CN 130b may include a plurality of core network components, such as a User Plane Function (UPF) (not shown in FIG. 1), an Access and Mobility Management Function (AMF) (not shown in FIG. 1) or a Mobility Management Entity (MME) (not shown in FIG. 1), and an Operation Administration and Maintenance (OAM) node (not shown in FIG. 1). The CNs may serve as a gateway for the WCDs to access the PTSN 140 and/or other networks (not shown in FIG. 1). A RAN may communicate with an AMF node via a N2 interface, and may communicate with a UPF node via a N3 interface.

A Wireless Communication Device 110a may be any type of device configured to operate and/or communicate in a wireless environment. By way of example, the WCD 110a may include a User Equipment (UE), a mobile station, a fixed or mobile subscriber unit, a pager, a cellular phone, a personal digital assistant, a smartphone, a laptop, a netbook, a personal computer, a wireless sensor, consumer electronics, a smart watch and the like. Persons skilled in the art should understand that as technology develops and advances, the terminologies described in the present disclosure may change, but should not affect or limit the principles and spirit of the present disclosure.

WCD 110a may include one or more Subscriber Identity Modules (SIMs) that enable it to access one or more separate wireless communication networks. As shown in FIG. 1, the WCD 110a may be configured to access either RAN 121a through BS 120a by virtue of a first SIM (not shown in FIG. 1) in WCD 110a or RAN 121b through the BS 120b by virtue of a second SIM (not shown in FIG. 1) in WCD 110a. While the WCD 110a is shown connected to the RAN 121a and the RAN 121b, in other examples (not shown), the WCD 110a may establish additional network connections using additional RATs.

Each of the first and second SIMs may be associated with one kind of wireless communication system. For example, either the first or the second SIM may be represented by a SIM card corresponding to a GSM system, a Universal Subscriber Identity Module (USIM) card corresponding to a UMTS system, a Removable User Identity Module (RUIM) card or a CDMA Subscriber Identity Module (CSIM) card corresponding to the CDMA2000 communication system, a Universal Integrated Circuit Card (UICC) corresponding to 5G (NR) communication system, a wireless network card corresponding to a IEEE 802.11x wireless local area network (WLAN), or other suitable modules that can identify the subscribers.

A WCD that includes a plurality of SIMs and connects to two or more networks with two or more SIMs being active at a given time may be a Multi-SIM-Multi-Active (MSMA) communication device. An example MSMA communication device may be a Dual-SIM-Dual-Active (DSDA) communication device, which may include two SIMs. Both SIMs may remain active. In some cases, only one SIM may be activate when, for example, a user of a DSDA communication device may insert only one SIM card into the device or only activate one SIM. In some embodiments of the present disclosure, a Non-Access Stratum (NAS) layer of a WCD may transmit an indicator indicating that a plurality of SIMs of the WCD are activated to an Access Stratum (AS) layer (e.g., a RRC layer) of the WCD.

On the other hand, a WCD provided with a plurality of SIMs and connected to two or more networks with one SIM being active at a given time is a Multi-SIM-Multi-Standby (MSMS) communication device. An example of the MSMS communication device may be a Dual-SIM-Dual-Standby (DSDS). A DSDS communication device may include two SIMs, and may use a single radio front-end and baseband to register the communication device to a single (the same) Public Land Mobile Network (PLMN) or to two different PLMNs with the two SIMs, respectively.

In a multi-SIM wireless communication device, e.g., a MSMS communication device, a plurality of SIMs may share a common set of Radio Frequency (RF) resources (such as a RF transceiver) of the wireless communication device. For example, a DSDS communication device may support a subscription service #A enabled by a SIM A and a subscription service #B enabled by a SIM B. Only one of the subscription service #A and subscription service #B may use RF resources to communicate with the corresponding wireless network at a time. However, embodiments described herein may also be applicable to multi-SIM wireless communication devices in which each of the plurality of SIMs is associated with a separate RF resource with one of the plurality of SIMs being active while the rest are deactivated.

According to the 3rd Generation Partnership Project (3GPP), from a perspective of a network, a UE (e.g., WCD 110a in FIG. 1) may be in one of the following states: RRC-IDLE state, RRC_CONNECTED state, and RRC_INACTIVE state, at a given time. In RRC_INACTIVE state, a UE does not have a RRC connection with the Radio Access Network (RAN). However, the RAN keeps a connection with the core network for the UE. Therefore, RRC_INACTIVE state may achieve power saving with acceptable access latency. The specific characteristics of RRC-IDLE state, RRC_CONNECTED state, and RRC_INACTIVE state are defined in 3GPP specifications.

A UE may be in an idle mode corresponding to the RRC_IDLE state, an inactive mode corresponding to the RRC_INACTIVE state, or a connected mode corresponding to the RRC_CONNECTED state. For example, referring to FIG. 1, from the perspective of RAN 121a (or BS 120a), the WCD 110a may be in an inactive mode; or from the perspective of RAN 121b (or BS 120b), the WCD 110a may be in an inactive mode.

In some other 3GPP application scenarios, for example, LTE/EPS (Evolved Packet System) access for CIoT (Cellular Internet of Things) optimization, similar to RRC_INACTIVE state, a UE may be in a Suspended RRC connection state. Embodiments described with respect to RRC_INACTIVE state in the present disclosure are also applicable for Suspended RRC connection state.

In a wireless communication system, a UE may need to register with a network to receive services. For example, when a UE is powered up, the UE may perform an initial registration with the wireless communication system. A UE staying at idle mode may also need to register its presence in a registration area periodically or when entering a new Tracking Area (TA). A registration Area is an area in which a UE may roam without a need to perform location registration. The core network may trigger a paging procedure for an idle UE when the core network wants to exchange data or control signaling with the idle UE.

Similarly, a UE staying at inactive mode may need to perform a RAN-based Notification Area (RNA) update periodically (hereinafter, "periodical RNA update") or when the UE moves out of a configured RNA (that is, triggered by a RNA change). RNA may allow base station to know the rough location of a UE that is in an inactive mode (inactive UE). The RNA may include one or more cells or one or more RAN areas, and may be configured by a RAN node (e.g., a base station) to a UE using, for example, dedicated signaling or message broadcasting. The RAN node may trigger a paging procedure for an inactive UE within the UE's RNA when the RAN wants to exchange data or control signaling with the inactive UE.

For example, in some embodiments of the present disclosure, when a last serving BS receives DL (downlink) data for an inactive UE from a CN entity, the last serving BS may page in the cells associated with the RNA configured to the UE. For example, the last serving BS may request BSs in the RNA to page the UE. The UE may receive the paging message from one of the BSs in the RNA, and may attempt to resume from the inactive state.

When one SIM (e.g., SIM A) of a multi-SIM UE is in an ongoing service, another SIM (e.g., SIM B) of the UE may receive a paging message from the corresponding Base Station (BS). If the UE decides to respond to the paging message, the service associated with SIM A may be interrupted. However, if the UE does not respond to the paging message, the network may waste more paging resources to obtain a response. Hence, a solution is required to handle paging control between multi-SIM UE(s) and networks or BSs in a wireless communication system.

In some embodiments of the present disclosure, the core network may support busy indication functionality. In other words, busy indication functionality for CN paging may be supported. In some embodiments of the present disclosure, the RAN may support busy indication functionality. In other words, busy indication functionality for RAN paging may be supported. The busy indication functionality allows a UE to transmit a busy indication to the network as a response to a paging. For example, when busy indication functionality for RAN paging or CN paging is supported, the UE may transmit a busy indication to the network to avoid the waste of paging resources.

In some embodiments of the present disclosure, the busy indication functionality is configurable. For example, the network (e.g., the BS or the CN) may configure a UE whether busy indication functionality for CN paging and/or RAN paging is supported or not. In these embodiments, a procedure for configuring the busy indication functionality is required. In some other embodiments of the present disclosure, the busy indication functionality may be supported or unsupported by default. When the busy indication functionality is supported, a procedure for transmitting the busy indication is required.

Embodiments of the present disclosure propose technical solutions for configuring the busy indication functionality, and technical solutions for transmitting the busy indication in wireless communication systems, such as a 5G communication system. More details on the embodiments of the present disclosure will be illustrated in the following text in combination with the appended drawings.

Figure 2:
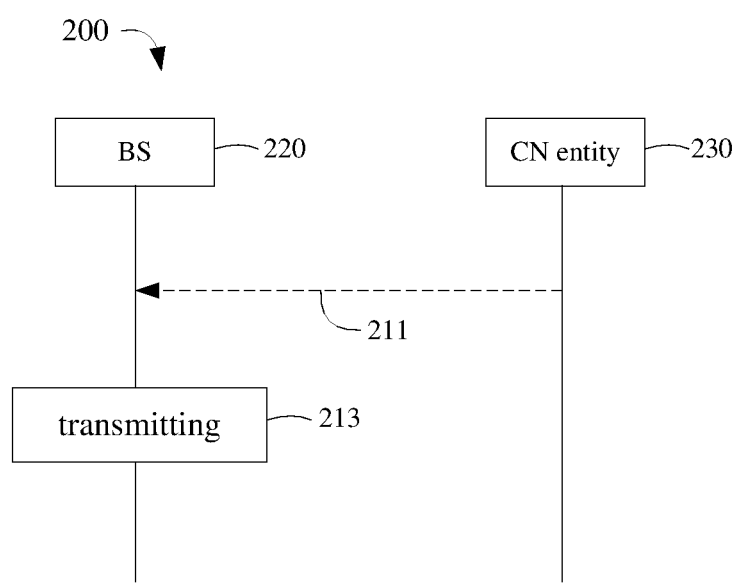
FIG. 2 illustrates a flow chart of an exemplary procedure of configuring busy indication functionality according to some embodiments of the present disclosure.

FIG. 2 illustrates a flow chart of an exemplary procedure 200 of configuring the busy indication functionality according to some embodiments of the present disclosure. The exemplary procedure 200 may be applied to configure busy indication functionality for CN paging, busy indication functionality for RAN paging, or a combination thereof. Details described in all the foregoing embodiments of the present disclosure are applicable for the embodiments shown in FIG. 2.

Referring to FIG. 2, in some embodiments of the present disclosure, a CN entity 230 may transmit an indicator to BS 220 in operation 211 (denoted by a dotted line as an option). In some embodiments of the present disclosure, the indicator may indicate whether busy indication functionality for CN paging is supported or not.

In some embodiments of the present disclosure, CN entity 230 may function as an Access and Mobility Management Function (AMF) node of a CN. CN entity 230 and BS 220 may communicate via a N2 interface. For example, CN entity 230 may function as an AMF of CN 130a in FIG. 1 and BS 220 may function as BS 120a in FIG. 1; or CN entity 230 may function as an AMF of CN 130b in FIG. 1 and BS 220 may function as BS 120b or BS 120c in FIG. 1.

In some embodiments of the present disclosure, CN entity 230 may function as an Operation Administration and Maintenance (OAM) node of a CN. For example, CN entity 230 may function as an OAM of CN 130a in FIG. 1 and BS 220 may function as BS 120a in FIG. 1; or CN entity 230 may function as an OAM of CN 130b in FIG. 1 and BS 220 may function as BS 120b or BS 120c in FIG. 1.

Still referring to FIG. 2, in operation 213, BS 220 may transmit system information. For example, BS 220 may broadcast the system information such as a System Information Block (SIB).

In some embodiments of the present disclosure, the broadcast system information may include information related to busy indication functionality. The information related to busy indication functionality may be associated with at least one of CN paging or RAN paging. In some embodiments of the present disclosure, the information related to busy indication functionality may be based on the indicator from CN entity 230.

In some embodiments of the present disclosure, the broadcast information may include an indicator having at least one bit. The indicator in the broadcast information may indicate one of: whether busy indication functionality for CN paging is supported or not; whether busy indication functionality for RAN paging is supported or not; or whether busy indication functionalities for both CN paging and RAN paging are supported or not. For example, the indicator may have one bit, and may have a value of "1" or a value of "0," to indicate whether busy indication functionality for CN paging is supported or not.

In some embodiments of the present disclosure, the broadcast information may include an Information Element (IE), for example, a busy support IE. The value of the IE may be of an enumerated type. For example, the possible value of the IE may be enumerated as {TRUE, FALSE}. The value of the IE equal to enumerated type TRUE may indicate one of: busy indication functionality for CN paging is supported; busy indication functionality for RAN paging is supported; or busy indication functionalities for both CN paging and RAN paging are supported. The value of the IE equal to enumerated type FALSE may indicate one of: busy indication functionality for CN paging is not supported; busy indication functionality for RAN paging is not supported; or busy indication functionality for either CN paging or RAN paging is not supported.

In some other examples, the possible value of the busy support IE may be enumerated as {TRUE}. The value of the IE equal to enumerated type TRUE may indicate that busy indication functionality is supported. When the busy indication functionality is not supported, the broadcast information may not include the busy support IE. For example, the broadcast information not including a busy support IE may indicate that busy indication functionality for CN paging is not supported, and the broadcast information including a busy support IE equal to enumerated type TRUE may indicate that busy indication functionality for CN paging is supported. In another example, the broadcast information not including a busy support IE may indicate that busy indication functionality for RAN paging is not supported, and the broadcast information including a busy support IE equal to enumerated type TRUE may indicate that busy indication functionality for RAN paging is supported. In yet another example, the broadcast information not including a busy support IE may indicate that busy indication functionality for either CN paging or RAN paging is not supported, and the broadcast information including a busy support IE equal to enumerated type TRUE may indicate that busy indication functionalities for both CN paging and RAN paging are supported.

In some embodiments of the present disclosure, BS 220 may broadcast a single indicator or busy support IEs (or the like) to indicate whether busy indication functionalities for both CN paging and RAN paging are supported or not. For example, BS 220 may receive from CN entity 230 an indicator (e.g., indicator #A') that indicating whether busy indication functionality for CN paging is supported or not. BS 220 may broadcast a SIB including an indicator #C to indicate one of: busy indication functionalities for both CN paging and RAN paging are supported, and busy indication functionality for either CN paging or RAN paging is not supported. Indicator #C is based on indicator #A'. In some other examples, the signal indicator #C may indicate one of: busy indication functionalities for both CN paging and RAN paging are supported; busy indication functionality for CN paging is supported and busy indication functionality for RAN paging is not supported; busy indication functionality for CN paging is not supported and busy indication functionality for RAN paging is supported; and busy indication functionality for either CN paging or RAN paging is not supported.

In some embodiments of the present disclosure, BS 220 may broadcast separate indicators or separate busy support IEs (or the like) to indicate whether busy indication functionality for CN paging is supported or not and whether busy indication functionality for RAN paging is supported or not. For example, BS 220 may receive from CN entity 230 an indicator (e.g., indicator #A') that indicating whether busy indication functionality for CN paging is supported or not. BS 220 may broadcast a SIB including an indicator #A to indicate whether busy indication functionality for CN paging is supported or not, and an indicator #B to indicate whether busy indication functionality for RAN paging is supported or not. Indicator #A is based on indicator #A'. Separate indicators for busy indication functionality may be advantageous since a finer granularity can be achieved.

In some embodiments of the present disclosure, whether busy indication functionality for CN paging is supported or not may be determined based on the indicator received from CN entity 230.

The above embodiments which involve an indicator to indicate the support of busy indication functionality can be referred to as an "explicit indication" approach. The following embodiments, which do not involve such indicator, can be referred to as an "implicit indication" approach.

In some embodiments of the present disclosure, whether busy indication functionality is supported or not may be implicitly indicated in the broadcast information. For example, when busy indication functionality is supported, the broadcast information may include parameters associated with the busy indication functionality. When busy indication functionality is not supported, the broadcast information may not include any parameters associated with the busy indication functionality. Such parameters may include, for example, the maximum transmission number of a busy indication. In this way, a UE which receives the broadcast information (e.g., a SIB) may determine whether the busy indication functionality for CN paging or RAN paging is supported or not based on whether the broadcast information includes parameters associated with the busy indication functionality or not.

For example, the broadcast information may include parameters associated with the busy indication functionality when busy indication functionality for CN paging is supported; and the broadcast information may not include parameters associated with the busy indication functionality when busy indication functionality for CN paging is not supported. The parameters associated with the busy indication functionality may be parameters specific to CN busy indication functionality (e.g., the maximum transmission number of a busy indication in response to CN paging) or general busy indication functionality parameters (e.g., the maximum transmission number of a busy indication in response to either CN paging or RAN paging).

In some other examples, the broadcast information may include parameters associated with the busy indication functionality when busy indication functionality for RAN paging is supported; and the broadcast information may not include parameters associated with the busy indication functionality when busy indication functionality for RAN paging is not supported. The parameters associated with the busy indication functionality may be parameters specific to RAN busy indication functionality (e.g., the maximum transmission number of a busy indication in response to RAN paging) or general busy indication functionality parameters.

In some other examples, the broadcast information may include parameters associated with the busy indication functionality when busy indication functionalities for both CN paging and RAN paging are supported; and the broadcast information may not include parameters associated with the busy indication functionality when busy indication functionality for either CN paging or RAN paging is not supported. The parameters associated with the busy indication functionality may be parameters specific to CN or RAN busy indication functionality or general busy indication functionality parameters.

Still referring to FIG. 2, a UE (not shown in FIG. 2) may receive the broadcast information from BS 220, and may determine whether the busy indication functionality for CN paging or RAN paging is supported or not based on the broadcast information. When the busy indication functionality for CN paging or RAN paging is supported, the UE may determine to transmit a busy indication to the network as a response to a CN paging or RAN paging.

It should be appreciated by persons skilled in the art that the sequence of the operations in exemplary procedure 200 may be changed and some of the operations in exemplary procedure 200 may be eliminated or modified, without departing from the spirit and scope of the disclosure. For example, operation 211 may be eliminated when the exemplary procedure 200 is employed to configure busy indication functionality for RAN paging only.

Figure 3:
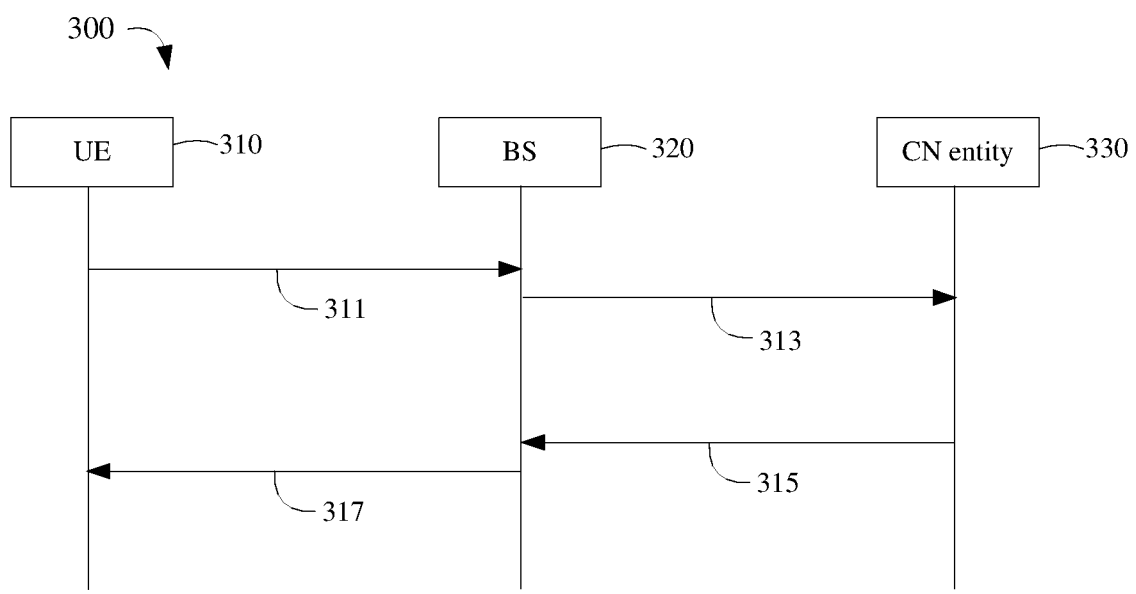
FIG. 3 illustrates a flow chart of an exemplary procedure of configuring busy indication functionality according to some embodiments of the present disclosure.

FIG. 3 illustrates a flow chart of an exemplary procedure 300 of configuring the busy indication functionality according to some embodiments of the present disclosure. Details described in all the foregoing embodiments of the present disclosure are applicable for the embodiments shown in FIG. 3.

Referring to FIG. 3, at the beginning, UE 310 may initiate a Non-Access Stratum (NAS) message registration procedure with a 5GS (5G system) or an EPS (Evolved Packet System). For example, at operation 311, UE 310 may transmit a NAS message (e.g., a NAS registration request message, a Tracking Area Update (TAU) or the like) to BS 320. At operation 313, BS 320 may forward (transparently transmit) the NAS message to CN entity 330.

In some embodiments of the present disclosure, UE 310 may function as WCD 110a in FIG. 1. BS 320 may function as BS 120a, BS 120b or BS 120c in FIG. 1. CN entity 330 may an AMF node or a MME node of CN 130a or CN130b.

Still referring to FIG. 3, at operation 315, CN entity 330 may transmits a NAS message (e.g., a NAS registration accept message or the like) to BS 320. The NAS message may include information related to busy indication functionality. For example, the NAS message may indicate whether busy indication functionality for CN paging is supported or not. In some embodiments of the present disclosure, the busy indication may be supported per CN entity (e.g., AMF), or per PLMN.

At operation 317, BS 320 may forward the NAS message to UE 310. After receiving the NAS message, the NAS layer of UE 310 may inform the AS layer of UE 310 that whether busy indication functionality for CN paging is supported or not. UE 310 may determine whether to transmit a busy indication to the network as a response to a CN paging based at least on the NAS message.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
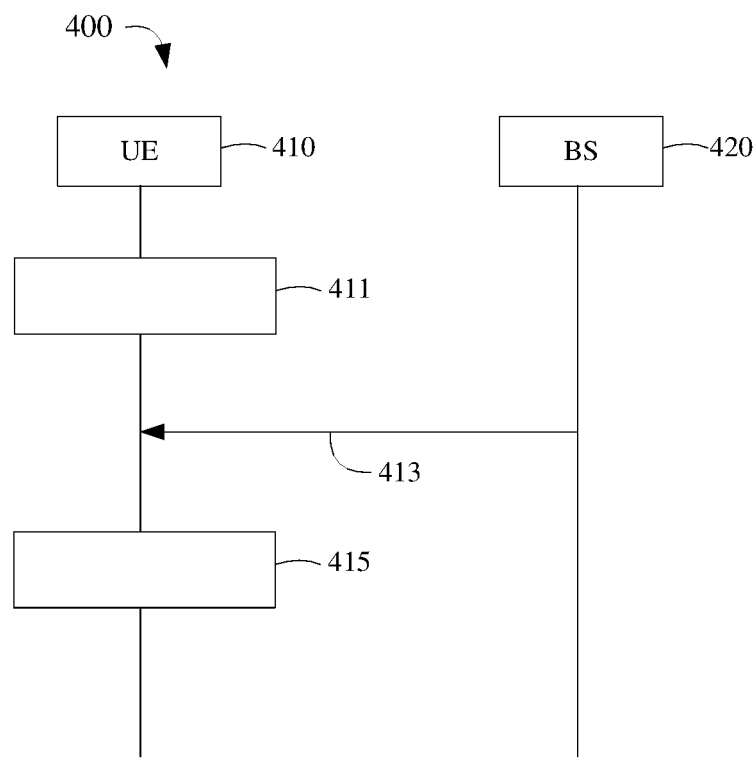
FIG. 4 illustrates a flow chart of an exemplary procedure of configuring busy indication functionality according to some embodiments of the present disclosure.

FIG. 4 illustrates a flow chart of an exemplary procedure 400 of configuring the busy indication functionality according to some embodiments of the present disclosure. The exemplary procedure 400 may be applied to configure busy indication functionality for CN paging, busy indication functionality for RAN paging, or a combination thereof. Details described in all the foregoing embodiments of the present disclosure are applicable for the embodiments shown in FIG. 4.

Referring to FIG. 4, in operation 411, UE 410 may be in a connected mode. For example, UE 410 may be in communication with a BS (e.g., BS 420). In some embodiments of the present disclosure, UE 410 may function as WCD 110a in FIG. 1. BS 420 may function as BS 120a, BS 120b or BS 120c in FIG. 1.

Still referring to FIG. 4, in operation 413, BS 420 may transmit a RRC dedicated signaling (e.g., a RRC Release message) to UE 410. In some embodiments of the present disclosure, the RRC dedicated signaling may include information related to busy indication functionality. The information related to busy indication functionality may be associated with at least one of CN paging or RAN paging. For example, the information related to busy indication functionality may indicate one of: whether busy indication functionality for CN paging is supported or not; whether busy indication functionality for RAN paging is supported or not; and whether busy indication functionalities for both CN paging and RAN paging are supported or not.

In some embodiments of the present disclosure, BS 420 may receive configurations of busy indication functionality for CN paging from a CN entity (not shown in FIG. 4), which is similar to operation 211 as described with respect to FIG. 2, and thus is omitted herein. The information related to busy indication functionality may be based on the configurations from the CN entity.

For example, BS 420 may transmit a RRC release message to UE 410 to configure UE 410 to an inactive mode (or a suspended mode) or idle mode. The RRC release message may include an indicator indicating whether busy indication functionality is supported or not.

In some embodiments of the present disclosure, UE 410 may determine that busy indication functionalities for both CN paging and RAN paging are supported when the RRC release message indicates that busy indication functionality is supported. UE 410 may determine that busy indication functionality for either CN paging or RAN paging is not supported when the RRC release message indicates that busy indication functionality is not supported.

In some embodiments of the present disclosure, the RRC release message may include a suspend configuration IE. The suspend configuration IE may be used to indicate whether busy indication functionality for RAN paging is supported or not. In some examples, the rest portion of the RRC release message may be used to indicate whether busy indication functionality for CN paging is supported or not. In some other examples, the rest portion of the RRC release message may be used to indicate whether busy indication functionalities for both CN paging and RAN paging is supported or not. For example, UE 410 may determine that busy indication functionality for RAN paging is supported when the suspend configuration IE indicates that busy indication functionality is supported. UE 410 may determine that busy indication functionality for RAN paging is not supported when the suspend configuration IE indicates that busy indication functionality is not supported. UE 410 may determine that busy indication functionality for CN paging is supported when the RRC release message excluding the suspend configuration IE indicates that busy indication functionality is supported. UE 410 may determine that busy indication functionality for CN paging is not supported when the RRC release message excluding the suspend configuration IE indicates that busy indication functionality is not supported.

Still referring to FIG. 4, in response to the RRC release message, UE 410 may, in operation 415, transition to an inactive mode (or a suspended mode) or idle mode. When UE 410 is in an inactive mode and busy indication functionality for RAN paging is supported, UE 410 may transmit a busy indication to the network as a response to a RAN paging. When UE 410 is in an idle mode and busy indication functionality for CN paging is supported, UE 410 may transmit a busy indication to the network as a response to a CN paging.

It should be appreciated by persons skilled in the art that the sequence of the operations in exemplary procedure 400 may be changed and some of the operations in exemplary procedure 400 may be eliminated or modified, without departing from the spirit and scope of the disclosure.

When the busy indication functionality is supported, a busy indication may be transmitted from a UE to the network. In some embodiments of the present disclosure, the busy indication may be included in a RRC message. In these embodiments, a new IE (e.g., busy indication IE) may be introduced into the RRC message. In some embodiments of the present disclosure, the busy indication may be included in a NAS message. More details on the embodiments of the present disclosure will be illustrated in the following text in combination with the appended drawings.

Figure 5:
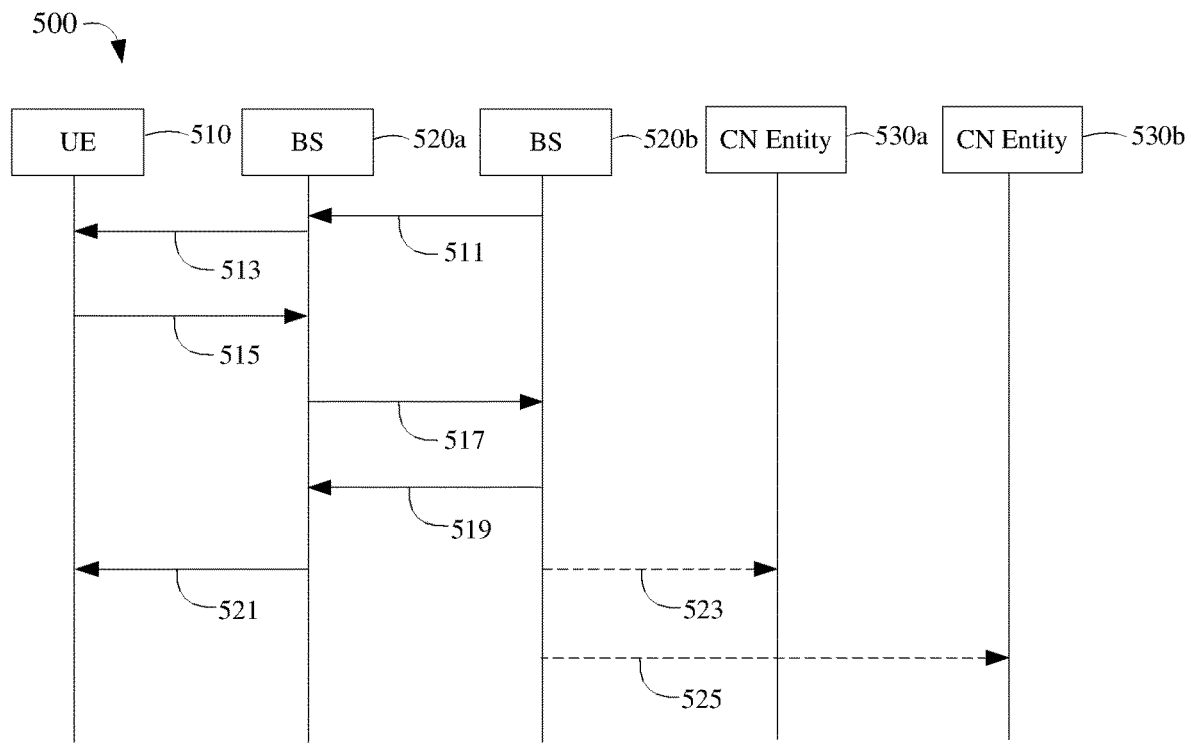
FIG. 5 illustrates a flow chart of an exemplary procedure of handling a paging message according to some embodiments of the present disclosure.

FIG. 5 illustrates a flow chart of an exemplary procedure 500 of handling a paging message according to some embodiments of the present disclosure. The exemplary procedure 500 may be applied to respond to a RAN paging. Details described in all the foregoing embodiments of the present disclosure are applicable for the embodiments shown in FIG. 5.

Referring to FIG. 5, at the beginning, UE 510 may be in communication with a base station (e.g., BS 520*b*), which is the serving base station or currently serving base station of UE 510. In some embodiments of the present disclosure, UE 510 may transition to an inactive mode (or a suspended mode). As mentioned above, inactive UE 510 may be configured with a RAN-based Notification Area (RNA), and may perform RNA update periodically or when UE 510 moves out of the configured RNA.

Under certain scenarios, for example, when BS 520*b* receives DL signaling(s) or DL data from the core network to inactive UE 510, BS 520*b* may need to reach UE 510, and may page UE 510. For example, BS 520*b* may page UE 510 in the cell(s) of BS 520*b* within the configured RNA, and may request other base stations to page UE 510 if the configured RNA includes cells of these base stations.

In some examples, inactive UE 510 may move out of the coverage of BS 520*b* and may move into the coverage of another base station (e.g., BS 520*a*). In operation 511, BS 520*b* may request BS 520*a* to page UE 510. In operation 513, BS 520*a* may page UE 510. In some embodiments of the present disclosure, the RAN paging message may include a cause value associated with a type of Mobile Termination (MT) service. The types of MT services may include a voice call service, emergency service, game service, Short Messaging Service (SMS), and so on. Different MT services may have different priorities. For example, the emergency service may have the highest priority, and voice call service may have a higher priority than SMS. In some other embodiments of the present disclosure, the RAN paging message may not include a paging cause.

Upon receiving the paging message from BS 520*a*, UE 510 may determine whether to respond to the paging message. In some embodiments of the present disclosure, when the busy indication functionality for RAN paging is supported, UE 510 may determine to respond a busy indication to the paging message.

For example, UE 510 may be a multi-SIM wireless communication device (e.g., WCD 110*a* in FIG. 1). UE 510 may be capable of supporting support a subscription service #A by virtue of a SIM A and a subscription service #B by virtue of a SIM B. Assuming that SIM B of UE 510 may receive the paging message from BS 520*a*, in some embodiments of the present disclosure, UE 510 may verify whether there is activity or ongoing service on SIM A, and whether to reject the RAN paging or not.

In some embodiments of the present disclosure, an Access Stratum (AS) layer of UE 510 may forward the paging cause to a Non-Access Stratum (NAS) layer of UE 510, which may determine whether to respond with a busy indication to the network. In some examples, when SIM A of UE 510 is in an ongoing service, UE 510 may determine to transmit a busy indication in response to the paging message for SIM B. In some examples, the determination to transmit the busy indication may be based on a priority of the MT service indicated by the paging cause. For example, when SIM A of UE 510 is in a voice call, and the paging message for SIM B of UE 510 is associated with a SMS, which has a lower priority than the voice call, UE 510 may determine to transmit a busy indication in response to the paging message. In another example, when the paging message for SIM B of UE 510 is associated with an emergence service, which has a higher priority than the voice call, UE 510 may accept the paging message and switch to the network associated with SIM B. In some embodiments of the present disclosure, a NAS layer of UE 510 may transmit an indicator indicating that a plurality of SIMs of the UE are activated to an AS layer of UE 510.

In some embodiments of the present disclosure, UE 510 may transmit the busy indication in a RRC message in response to the paging message from BS 520a. For example, UE 510 may resume from the inactive mode, and may, in operation 515, transmit a RRC resume request message to BS 520a. BS 520b becomes the last serving base station of UE 510, while BS 520a becomes the serving base station or currently serving base station of UE 510. In some embodiments of the present disclosure, the RRC resume request message may include a cause value indicating a busy indication.

In some embodiments of the present disclosure, the RRC resume request message may include the identity of UE 510. The identity of UE 510 may be a resume ID configured by the last serving base station (e.g., BS 520b) in a RRC release message. The resume ID may include information regarding the last serving base station (e.g., BS 520b). For example, a resume ID may include an Inactive-Radio Network Temporary Identifier (I-RNTI).

In operation 517, BS 520a may transmit a request (e.g., a retrieve UE context request message) for acquiring the UE context of UE 510 to the last serving base station (e.g., BS 520b) of UE 510. BS 520a and BS 520b may communicate with each other via Xn interface. In some embodiments of the present disclosure, the retrieve UE context request message may include the identity of UE 510.

In some embodiments of the present disclosure, the retrieve UE context request message may include the cause value in the RRC resume request message. For example, the retrieve UE context request message may include an IE indicating the RRC Resume Cause. The IE may be of an enumerated type. For example, the possible value of the IE may be enumerated as {RNA-UPDATE, BUSY INDICATION, . . . }. The value of the IE equal to enumerated type RNA-UPDATE may indicate that a UE resumes from the inactive state to perform RNA update. The value of the IE equal to enumerated type BUSY INDICATION may indicate that a UE resumes from the inactive state to indicate that the US is busy.

After receiving a request for acquiring the UE context, BS 520b may identify the busy indication and may determine not to relocate the UE context. BS 520b may store information, for example, Cell-Radio Network Temporary Identifier (C-RNTI) and Physical Cell Identifier (PCI) related to the resumption cell, to be used in a next resume attempt. In operation 519, BS 520b may transmit a retrieve UE context failure message to BS 520a. The retrieve UE context failure message may include an encapsulated RRC release message. The RRC release message may include suspend configuration. In operation 521, BS 520a may transmit the RRC release message to UE 510.

It would be beneficial to not relocate the UE context of a UE when the UE is busy since signaling associated with path switch procedure may be skipped. However, in some other embodiments, a BS may still determine to relocate the UE context when the BS identifies that the UE is busy.

Still referring to FIG. 5, BS 520b may be in communication with a core network including a plurality of CN entities such as CN entity 530a and CN entity 530b. CN entity 530a may function as an AMF node, and CN entity 530b may function as a UPF node. BS 520b may transmit a message indicating that UE 510 is busy to the core network, for example, to one or both of CN entity 530a and CN entity 530b. For example, in some embodiments of the present disclosure, BS 520b may transmit a message indicating that UE 510 is busy to CN entity 530a in operation 523 (denoted by a dotted line as an option). In some embodiments of the present disclosure, BS 520b may transmit a message indicating that UE 510 is busy to CN entity 530b in operation 525 (denoted by a dotted line as an option). The message may include an indicator indicating that UE 510 is busy. In some other embodiments of the present disclosure, BS 520b may not transmit the message indicating that UE 510 is busy to the core network.

It should be appreciated by persons skilled in the art that the sequence of the operations in exemplary procedure 500 may be changed and some of the operations in exemplary procedure 500 may be eliminated or modified, without departing from the spirit and scope of the disclosure. For example, as mentioned above, one or both of operations 523 and 525 may be eliminated.

Figure 6:
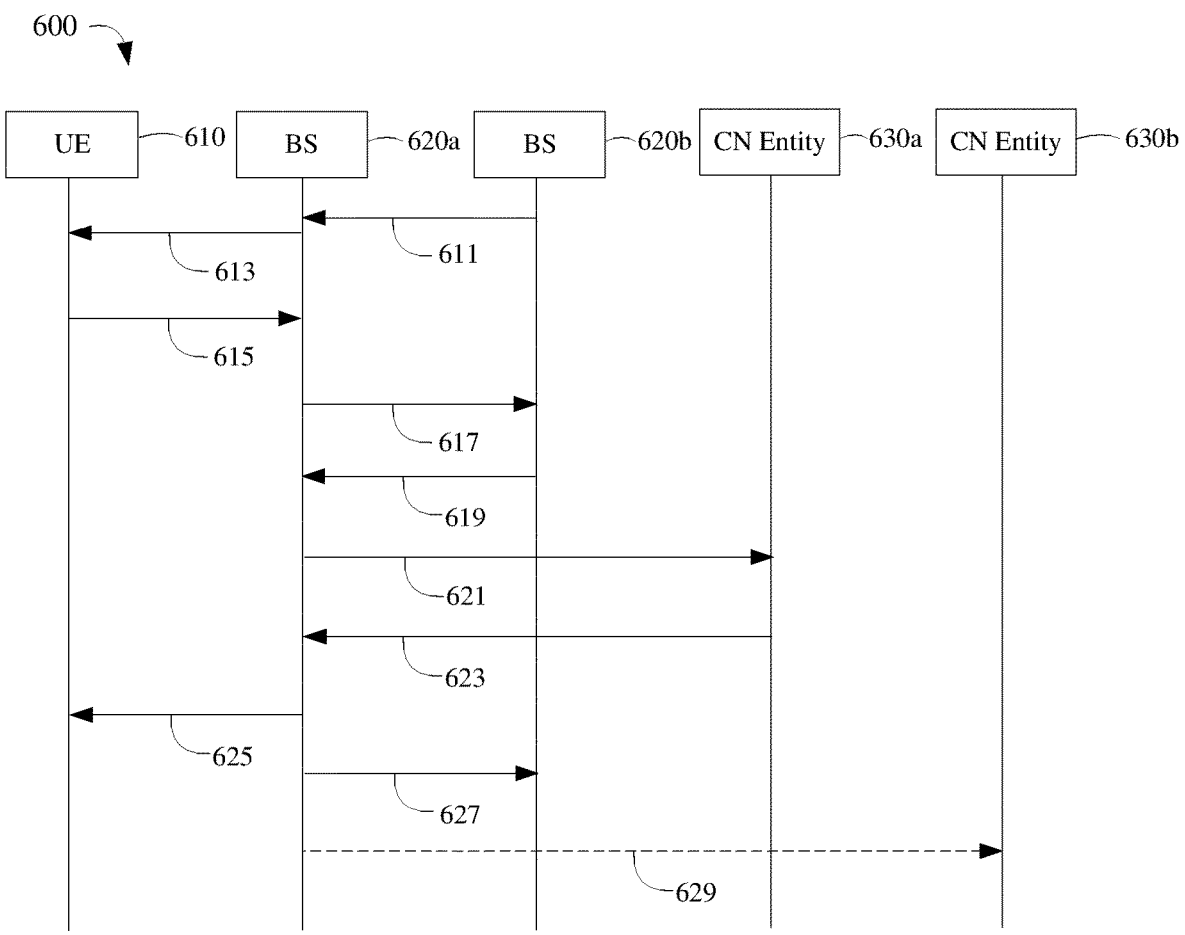
FIG. 6 illustrates a flow chart of an exemplary procedure of handling a paging message according to some embodiments of the present disclosure.

FIG. 6 illustrates a flow chart of an exemplary procedure 600 of handling a paging message according to some embodiments of the present disclosure. The exemplary procedure 600 may be applied to respond to a RAN paging. Details described in all the foregoing embodiments of the present disclosure are applicable for the embodiments shown in FIG. 6.

Referring to FIG. 6, at the beginning, UE 610 may be in communication with a base station (e.g., BS 620b), which is the serving base station or currently serving base station of UE 610. In some embodiments of the present disclosure, UE 610 may transition to an inactive mode (or a suspended mode). As mentioned above, inactive UE 610 may be configured with a RAN-based Notification Area (RNA), and may perform RNA update periodically or when UE 610 moves out of the configured RNA.

Under certain scenarios, for example, when BS 620b receives DL signaling(s) or DL data from the core network to inactive UE 610, BS 620b may need to reach UE 610, and may page UE 610. For example, BS 620b may page UE 610 in the cell(s) of BS 620b within the configured RNA, and may request other base stations to page UE 610 if the configured RNA includes cells of these base stations.

In some examples, inactive UE 610 may move out of the coverage of BS 620b and may move into the coverage of another base station (e.g., BS 620a). In operation 611, BS 620b may request BS 620a to page UE 610. In operation 613, BS 620a may page UE 610. In some embodiments of the present disclosure, the RAN paging message may include a cause value associated with a type of Mobile Termination (MT) service. The types of MT services may include a voice call service, emergency service, game service, Short Messaging Service (SMS), and so on. Different MT services may have different priorities. For example, the emergency service may have the highest priority, and voice call service may have a higher priority than SMS. In some other embodiments of the present disclosure, the RAN paging message may not include a paging cause.

Upon receiving the paging message from BS 620a, UE 610 may determine whether to respond to the paging message. In some embodiments of the present disclosure, when the busy indication functionality for RAN paging is supported, UE 610 may determine to respond a busy indication to the paging message.

For example, UE 610 may be a multi-SIM wireless communication device (e.g., WCD 110a in FIG. 1). UE 610 may be capable of supporting support a subscription service

A by virtue of a SIM A and a subscription service #B by virtue of a SIM B. Assuming that SIM B of UE 610 may receive the paging message from BS 620*a*, in some embodiments of the present disclosure, UE 610 may verify whether there is activity or ongoing service on SIM A, and whether to reject the RAN paging or not.

In some embodiments of the present disclosure, an Access Stratum (AS) layer of UE 610 may forward the paging cause to a Non-Access Stratum (NAS) layer of UE 610, which may determine whether to respond with a busy indication to the network. In some examples, when SIM A of UE 610 is in an ongoing service, UE 610 may determine to transmit a busy indication in response to the paging message for SIM B. In some examples, the determination to transmit the busy indication may be based on a priority of the MT service indicated by the paging cause. For example, when SIM A of UE 610 is in a voice call, and the paging message for SIM B of UE 610 is associated with a SMS, which has a lower priority than the voice call, UE 610 may determine to transmit a busy indication in response to the paging message. In another example, when the paging message for SIM B of UE 610 is associated with an emergence service, which has a higher priority than the voice call, UE 610 may accept the paging message and switch to the network associated with SIM B. In some embodiments of the present disclosure, a NAS layer of UE 610 may transmit an indicator indicating that a plurality of SIMs of the UE are activated to an AS layer of UE 610.

In some embodiments of the present disclosure, UE 610 may transmit the busy indication in a RRC message in response to the paging message from BS 620*a*. For example, UE 610 may resume from the inactive mode, and may, in operation 615, transmit a RRC resume request message to BS 620*a*. BS 620*b* becomes the last serving base station of UE 610, while BS 620*a* becomes the serving base station or currently serving base station of UE 610. In some embodiments of the present disclosure, the RRC resume request message may include a cause value indicating a busy indication.

In some embodiments of the present disclosure, the RRC resume request message may include the identity of UE 610. The identity of UE 610 may be a resume ID configured by the last serving base station (e.g., BS 620*b*) in a RRC release message. The resume ID may include information regarding the last serving base station (e.g., BS 620*b*). For example, a resume ID may include an Inactive-Radio Network Temporary Identifier (I-RNTI).

In operation 617, BS 620*a* may transmit a request (e.g., a retrieve UE context request message) for acquiring the UE context of UE 610 to the last serving base station (e.g., BS 620*b*) of UE 610. BS 620*a* and BS 620*b* may communicate with each other via Xn interface. In some embodiments of the present disclosure, the retrieve UE context request message may include the identity of UE 610.

In some embodiments of the present disclosure, the retrieve UE context request message may include the cause value in the RRC resume request message. For example, the retrieve UE context request message may include an IE indicating the RRC Resume Cause. The IE may be of an enumerated type. For example, the possible value of the IE may be enumerated as {RNA-UPDATE, BUSY INDICATION, . . . }. The value of the IE equal to enumerated type RNA-UPDATE may indicate that a UE resumes from the inactive state to perform RNA update. The value of the IE equal to enumerated type BUSY INDICATION may indicate that a UE resumes from the inactive state to indicate that the US is busy.

After receiving a request for acquiring the UE context, BS 620*b* may identify the busy indication and may determine to relocate the UE context of UE 610. In operation 619, BS 620*b* may transmit a retrieve UE context response message to BS 620*a*. The retrieve UE context response message may include the UE context of UE 610.

BS 620*a* may be in communication with a core network including a plurality of CN entities such as CN entity 630*a* and CN entity 630*b*. CN entity 630*a* may function as an AMF node, and CN entity 630*b* may function as a UPF node. In operations 621 and 623, BS 620*a* may perform a path switch procedure for UE 610. In operation 621, BS 620*a* may transmit a path switch request message for UE 610 to the core network (e.g., CN entity 630*a*). The path switch request message may indicate that UE 610 is busy. For example, the path switch request message may include a busy indication. In operation 623, CN entity 630*a* may transmit a path switch request response to BS 620*a*. The path switch request response may include the identity of UE 610.

In operation 625, BS 620*a* may transmit a RRC release message to UE 610 in the case that BS 620*a* determines to send UE 610 to an inactive state. The RRC release message may include suspend configuration. The suspend configuration may include at least one of the following: a full length of a resume ID, a short length of the resume ID, a paging cycle, RNA information, a timer value of a periodical RNA update timer, and a next hop chaining count. The definitions for the above parameters are defined in the 3GPP technical specification. The resume ID (e.g., I-RNTI) may be allocated by BS 620*a*. In some other embodiments of the present disclosure, BS 620*a* may determine to send UE 610 to a connected state, and may transmit a connection setup message to UE 610. In operation 627, BS 620*a* may transmit a UE context release message to BS 620*b*. The release message may trigger the release of UE resources for UE 610 at BS 620*b*.

In some embodiments of the present disclosure, BS 620*a* may transmit a message indicating that UE 610 is busy to CN entity 630*b* in operation 629 (denoted by a dotted line as an option). The message may include an indicator indicating that UE 610 is busy. In some other embodiments of the present disclosure, BS 620*a* may not transmit the message indicating that UE 610 is busy to CN entity 630*b*.

It should be appreciated by persons skilled in the art that the sequence of the operations in exemplary procedure 600 may be changed and some of the operations in exemplary procedure 600 may be eliminated or modified, without departing from the spirit and scope of the disclosure. For example, as mentioned above, operation 629 may be eliminated.

Figure 7:
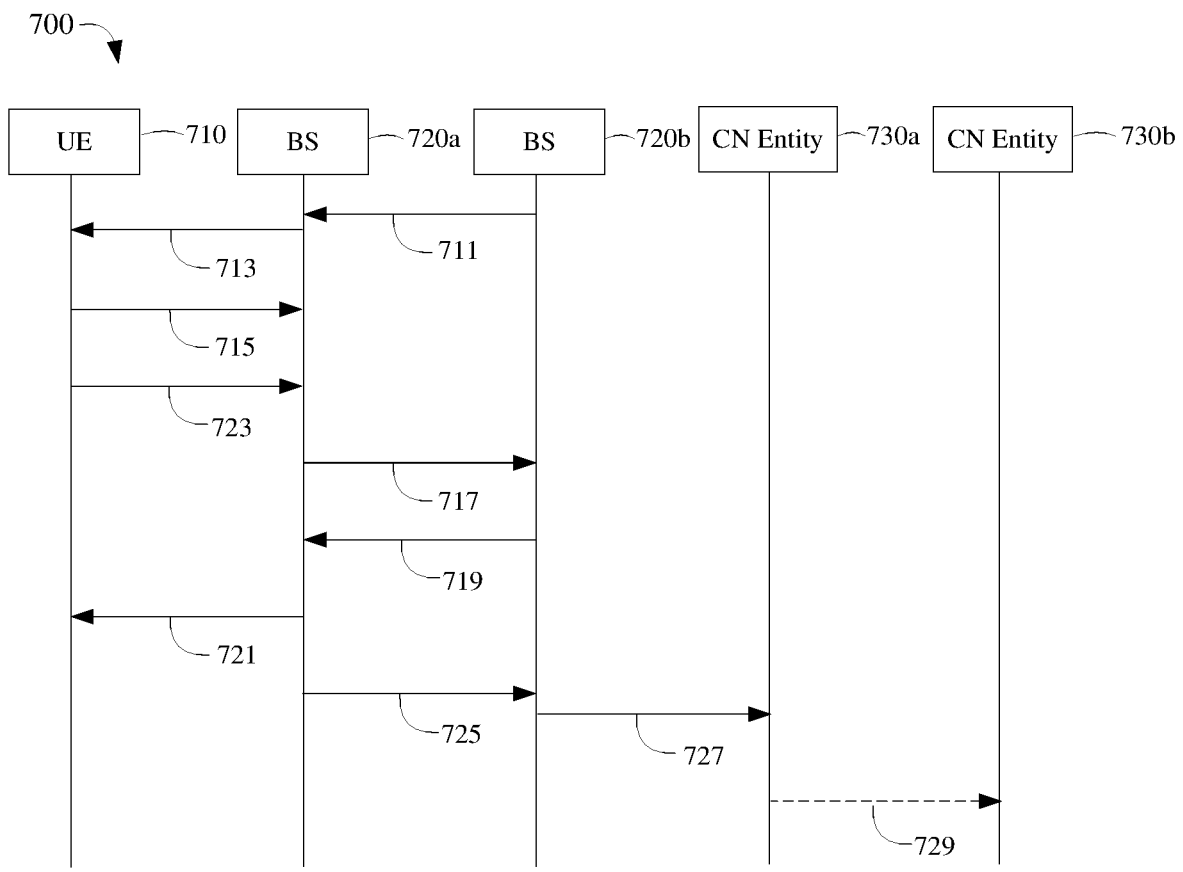
FIG. 7 illustrates a flow chart of an exemplary procedure of handling a paging message according to some embodiments of the present disclosure.

FIG. 7 illustrates a flow chart of an exemplary procedure 700 of handling a paging message according to some embodiments of the present disclosure. The exemplary procedure 700 may be applied to respond to a RAN paging. Details described in all the foregoing embodiments of the present disclosure are applicable for the embodiments shown in FIG. 7.

Some of the operations in exemplary procedure 700 are similar to those in exemplary procedure 500 in FIG. 5. For example, the above descriptions regarding operations 511-521 in FIG. 5 can also be applied to operations 711-721 in FIG. 7. UE 710, BS 720*a*, BS 720*b*, CN entity 730*a*, CN entity 730*b* in FIG. 7 may function as UE 510, BS 520*a*, BS 520*b*, CN entity 530*a*, CN entity 530*b* in FIG. 5.

Referring to FIG. 7, UE 710 may generate a NAS message (e.g., a NAS service request message) including a busy indication, and may encode the NAS service request message into a RRC message. For example, assuming that SIM B of UE 710 may receive the paging message from BS 720a, a NAS layer associated with SIM B may generate a NAS service request message including a busy indication and deliver the message to a AS layer (e.g., RRC layer) associated with SIM B. The AS layer may encode the NAS service request message into a RRC message. In operation 723, UE 710 may transmit the RRC message including the NAS service request message to BS 720a.

In response to receiving the RRC message, BS 720a may, in operation 725, forward the NAS service request message to the last serving base station (e.g., BS 720b). BS 720b may be in communication with a core network including a plurality of CN entities such as CN entity 730a and CN entity 730b. CN entity 730a may function as an AMF node, and CN entity 730b may function as a UPF node. In operation 727, BS 720b may forward the NAS service request message to the core network (e.g., CN entity 730a). CN entity 730a may identify the busy indication in the NAS service request message, and may know that UE 710 is busy.

In some embodiments of the present disclosure, CN entity 730a may transmit a message indicating that UE 710 is busy to CN entity 730b in operation 729 (denoted by a dotted line as an option). The message may include an indicator indicating that UE 710 is busy. In some other embodiments of the present disclosure, CN entity 730a may not transmit the message indicating that UE 710 is busy to CN entity 730b.

It should be appreciated by persons skilled in the art that the sequence of the operations in exemplary procedure 700 may be changed and some of the operations in exemplary procedure 700 may be eliminated or modified, without departing from the spirit and scope of the disclosure. For example, as mentioned above, operation 729 may be eliminated.

Figure 8:
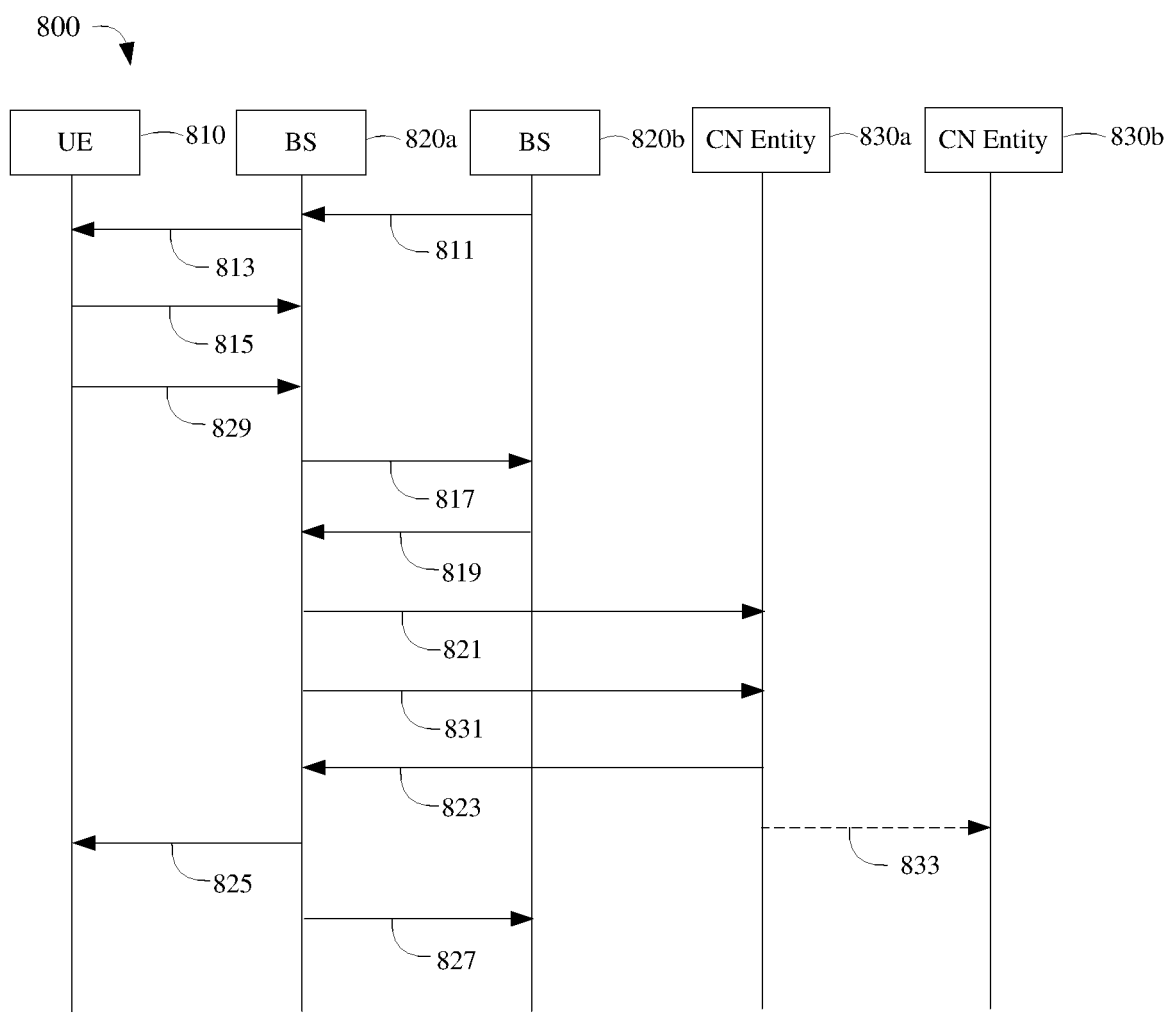
FIG. 8 illustrates a flow chart of an exemplary procedure of handling a paging message according to some embodiments of the present disclosure.

FIG. 8 illustrates a flow chart of an exemplary procedure 800 of handling a paging message according to some embodiments of the present disclosure. The exemplary procedure 800 may be applied to respond to a RAN paging. Details described in all the foregoing embodiments of the present disclosure are applicable for the embodiments shown in FIG. 8.

Some of the operations in exemplary procedure 800 are similar to those in exemplary procedure 600 in FIG. 6. For example, the above descriptions regarding operations 611-627 in FIG. 6 can also be applied to operations 811-827 in FIG. 8 except that in operation 821, the path switch request message to the core network (e.g., CN entity 830a) may not include a busy indication. Instead, UE 810 may generate a NAS message (e.g., a NAS service request message) including a busy indication, and may encode the NAS service request message into a RRC message. In operation 829, UE 810 may transmit the RRC message including the NAS service request message to BS 820a.

For example, assuming that SIM B of UE 810 may receive a paging message from BS 820a, a NAS layer associated with SIM B may generate a NAS service request message including a busy indication and may deliver the message to a AS layer associated with SIM B. The AS layer (e.g., RRC layer) may encode the NAS service request message into a RRC message.

BS 820b may be in communication with a core network including a plurality of CN entities such as CN entity 830a and CN entity 830b. CN entity 830a may function as an AMF node, and CN entity 830b may function as a UPF node. In response to receiving the RRC message, BS 820a may, in operation 831, forward the NAS service request message in the RRC message to the core network (e.g., CN entity 830a). CN entity 830a may identify the busy indication in the NAS service request message, and may know that UE 810 is busy.

In some embodiments of the present disclosure, CN entity 830a may transmit a message indicating that UE 810 is busy to CN entity 830b in operation 833 (denoted by a dotted line as an option). The message may include an indicator indicating that UE 810 is busy. In some other embodiments of the present disclosure, CN entity 830a may not transmit the message indicating that UE 810 is busy to CN entity 830b.

It should be appreciated by persons skilled in the art that the sequence of the operations in exemplary procedure 800 may be changed and some of the operations in exemplary procedure 800 may be eliminated or modified, without departing from the spirit and scope of the disclosure. For example, as mentioned above, operation 833 may be eliminated.

Figure 9:
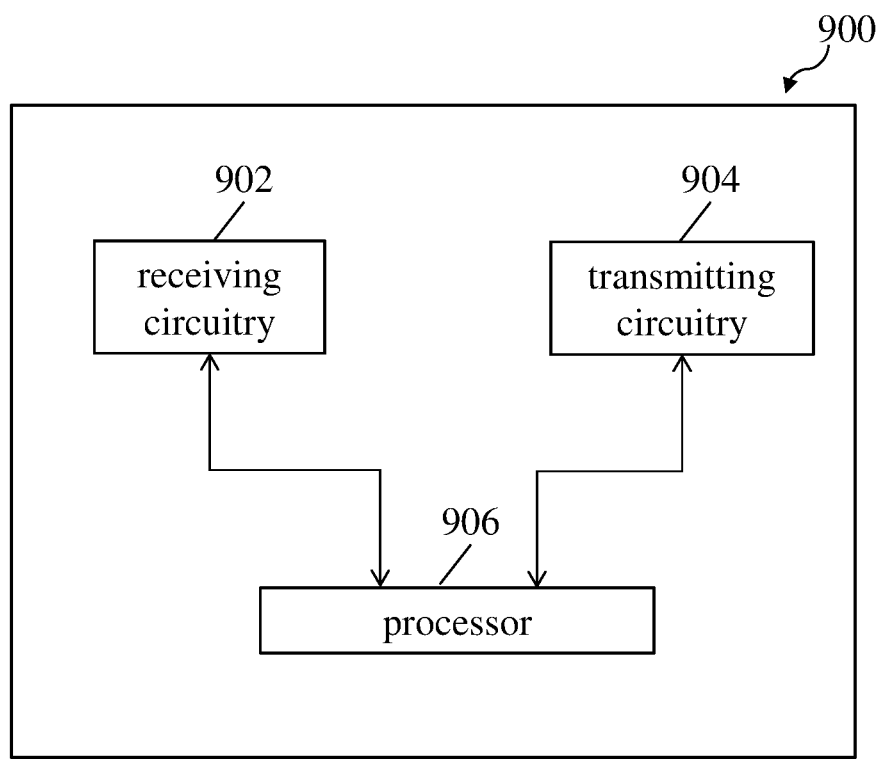
FIG. 9 illustrates an example block diagram of an apparatus according to some embodiments of the present disclosure.

FIG. 9 illustrates an example block diagram of an apparatus 900 according to some embodiments of the present disclosure.

As shown in FIG. 9, the apparatus 900 may include at least one non-transitory computer-readable medium (not illustrated in FIG. 9), a receiving circuitry 902, a transmitting circuitry 904, and a processor 909 coupled to the non-transitory computer-readable medium (not illustrated in FIG. 9), the receiving circuitry 902 and the transmitting circuitry 904. The apparatus 900 may be a BS, a WCD (e.g., a UE), or a CN entity (e.g., a MME, an AMF, or a UPF).

Although in this figure, elements such as processor 909, transmitting circuitry 904, and receiving circuitry 902 are described in the singular, the plural is contemplated unless limitation to the singular is explicitly stated. In some embodiments of the present disclosure, the receiving circuitry 902 and the transmitting circuitry 904 are combined into a single device, such as a transceiver. In certain embodiments of the present disclosure, the apparatus 900 may further include an input device, a memory, and/or other components.

In some embodiments of the present disclosure, the non-transitory computer-readable medium may have stored thereon computer-executable instructions to cause a processor to implement the operations with respect to the UE as described above. For example, the computer-executable instructions, when executed, cause the processor 909 interacting with receiving circuitry 902 and transmitting circuitry 904, to perform the operations with respect to the WCD depicted with respect to FIG. 1 and the UEs depicted with respect to FIGS. 2-8.

For example, the receiving circuitry 902 may receive at a UE information related to busy indication functionality. The busy indication functionality may be associated with at least one of CN paging or RAN paging. In some other examples, the receiving circuitry 902 may receive a SIB at a UE. The processor 909 may determine that busy indication functionality associated with at least one of CN paging or RAN paging is not supported when the SIB does not include parameters associated with the busy indication functionality. In yet other examples, the receiving circuitry 902 may receive a RAN paging at a UE from a base station. The transmitting circuitry 904 may transmit to the base station a RRC resume request message comprising a busy indication when busy indication functionality for RAN paging is supported.

In some embodiments of the present disclosure, the non-transitory computer-readable medium may have stored thereon computer-executable instructions to cause a processor to implement the method with respect to the BS as described above. For example, the computer-executable instructions, when executed, cause the processor 909 interacting with receiving circuitry 902 and transmitting circuitry 904, to perform the operations with respect to the BSs depicted in FIGS. 1-8.

For example, the transmitting circuitry 904 may transmit information related to busy indication functionality. The busy indication functionality is associated with at least one of CN paging or RAN paging. In some other examples, the transmitting circuitry 904 may transmit a RAN paging to a UE. The receiving circuitry 902 may receive from the UE a RRC resume request message including a busy indication. The transmitting circuitry 904 may further transmit to a last serving base station of the UE a retrieve UE context request message including a cause value indicating the busy indication. In yet other examples, the transmitting circuitry 904 may transmit a RAN paging. The receiving circuitry 902 may receive from a base station a retrieve UE context request message including a cause value indicating a busy indication in response to the RAN paging.

In some embodiments of the present disclosure, the non-transitory computer-readable medium may have stored thereon computer-executable instructions to cause a processor to implement the method with respect to the BS as described above. For example, the computer-executable instructions, when executed, cause the processor 909 interacting with receiving circuitry 902 and transmitting circuitry 904, to perform the operations with respect to the CN entities depicted in FIGS. 1-8.

For example, the transmitting circuitry 904 may transmit an indicator that indicating whether busy indication functionality for CN paging is supported or not. In some other examples, the transmitting circuitry 904 may transmit a NAS message indicating whether the busy indication functionality for CN paging is supported or not.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

The following is what is claimed:

1. A method performed by a user equipment (UE), the method comprising:
    receiving information related to busy indication functionality of a network, wherein the busy indication functionality is associated with at least one of core network (CN) paging or radio access network (RAN) paging, and wherein the information related to the busy indication functionality indicates whether the busy indication functionality is supported for at least one of the CN paging or the RAN paging; and
    determining that the busy indication functionality is supported based on the information.

2. The method of claim 1, wherein the information comprises an indicator having at least one bit, and the indicator indicates one of:
    the busy indication functionality for the CN paging is supported;
    the busy indication functionality for the RAN paging is supported; or
    the busy indication functionality for both the CN paging and the RAN paging is supported.

3. The method of claim 1, wherein the information comprises an information element (IE) indicating one of:
    the busy indication functionality for the CN paging is supported;
    the busy indication functionality for the RAN paging is supported; or
    the busy indication functionality for both the CN paging and the RAN paging is supported.

4. The method of claim 3, wherein a value of the IE is equal to an enumerated type true.

5. The method of claim 1, further comprising:
    determining that the busy indication functionality is supported when the information comprises parameters associated with the busy indication functionality.

6. The method of claim 5, wherein determining that the busy indication functionality is supported comprises determining one of:
    the busy indication functionality for the CN paging is supported;
    the busy indication functionality for the RAN paging is supported; or
    the busy indication functionality for both the CN paging and the RAN paging is supported.

7. The method of claim 1, wherein the information is received via a non-access stratum (NAS) message, and the information indicates whether the busy indication functionality for the CN paging is supported.

8. The method of claim 1, wherein the information is received via radio resource control (RRC) dedicated signaling, and the information indicates one of:
    the busy indication functionality for the CN paging is supported;
    the busy indication functionality for the RAN paging is supported; or
    the busy indication functionality for both the CN paging and the RAN paging is supported.

9. The method of claim 8, wherein the RRC dedicated signaling comprises a RRC release message comprising a suspend configuration information element (IE).

10. A user equipment (UE) for wireless communication, comprising:
    at least one memory; and
    at least one processor coupled with the at least one memory and configured to cause the UE to:
        receive information related to busy indication functionality of a network, wherein the busy indication functionality is associated with at least one of core network (CN) paging or radio access network (RAN) paging, and wherein the information related to the busy indication functionality indicates whether the busy indication functionality is supported for at least one of the CN paging or the RAN paging; and
        determine that the busy indication functionality is supported based on the information.

11. The UE of claim 10, wherein the information comprises an indicator having at least one bit, and the indicator indicates one of:
    the busy indication functionality for the CN paging is supported;
    the busy indication functionality for the RAN paging is supported; or
    the busy indication functionality for both the CN paging and the RAN paging is supported.

12. The UE of claim 10, wherein the information comprises an information element (IE) indicating one of:
    the busy indication functionality for the CN paging is supported;
    the busy indication functionality for the RAN paging is supported; or
    the busy indication functionality for both the CN paging and the RAN paging is supported.

13. The UE of claim 12, wherein a value of the IE is equal to an enumerated type true.

14. The UE of claim 10, wherein the at least one processor is configured to cause the UE to determine that the busy indication functionality is supported when the information comprises parameters associated with the busy indication functionality.

15. The UE of claim 14, wherein, to determine that the busy indication functionality is supported, the at least one processor is configured to cause the UE to determine one of:
    the busy indication functionality for the CN paging is supported;
    the busy indication functionality for the RAN paging is supported; or
    the busy indication functionality for both the CN paging and the RAN paging is supported.

16. The UE of claim 10, wherein the at least one processor is configured to cause the UE to determine whether to reject a paging message based on the busy indication functionality.

17. A base station for wireless communication, comprising:
    at least one memory; and
    at least one processor coupled with the at least one memory and configured to cause the base station to:
        transmit information related to busy indication functionality of a network, wherein the busy indication functionality is associated with at least one of core network (CN) paging or radio access network (RAN) paging, and wherein the information related to the busy indication functionality indicates whether the busy indication functionality is supported for at least one of the CN paging or the RAN paging; and
        transmit a paging message based on the information.

18. The base station of claim 17, wherein the at least one processor is configured to cause the base station to receive, from a CN entity, an indication of whether the busy indication functionality for CN paging is supported.

19. The base station of claim 18, wherein the CN entity comprises at least one of an access and mobility management function (AMF) node or an operation administration and maintenance (OAM) node.

20. A processor for wireless communication, comprising:
    at least one controller coupled with at least one memory and configured to cause the processor to:
    receive information related to busy indication functionality of a network, wherein the busy indication functionality is associated with at least one of core network (CN) paging or radio access network (RAN) paging, and wherein the information related to the busy indication functionality indicates whether the busy indication functionality is supported for at least one of the CN paging or the RAN paging; and
    determine that the busy indication functionality is supported based on the information.

\* \* \* \* \*